(12) United States Patent  
Ramanujam et al.

(10) Patent No.: US 9,042,397 B2
(45) Date of Patent: May 26, 2015

(54) METHOD AND APPARATUS FOR ACHIEVING FAIRNESS IN INTERCONNECT USING AGE-BASED ARBITRATION AND TIMESTAMPING

(75) Inventors: Rohit Sunkam Ramanujam, Santa Clara, CA (US); Sailesh Kumar, San Jose, CA (US); William Lynch, Los Altos, CA (US)

(73) Assignee: Futurewei Technologies, Inc., Plano, TX (US)

( * ) Notice: Subject to any disclaimer, the term of this patent is extended or adjusted under 35 U.S.C. 154(b) by 343 days.

(21) Appl. No.: 13/308,864

(22) Filed: Dec. 1, 2011

(65) Prior Publication Data

US 2012/0195322 A1 Aug. 2, 2012

Related U.S. Application Data

(60) Provisional application No. 61/438,807, filed on Feb. 2, 2011.

(51) Int. Cl.
*H04L 12/875* (2013.01)
*H04L 12/46* (2006.01)
*H04L 12/867* (2013.01)

(52) U.S. Cl.
CPC .......... *H04L 47/564* (2013.01); *H04L 12/4637* (2013.01); *H04L 47/629* (2013.01)

(58) Field of Classification Search
CPC ......... H04L 49/90; H04L 47/10; H04L 49/00; H04L 47/00

USPC ................... 370/400, 413, 474, 389
See application file for complete search history.

(56) References Cited

U.S. PATENT DOCUMENTS

| 6,088,734 | A | * | 7/2000 | Marin et al. | 709/232 |
|---|---|---|---|---|---|
| 6,674,720 | B1 | | 1/2004 | Passint et al. | |
| 7,940,756 | B1 | * | 5/2011 | Duffy et al. | 370/389 |
| 8,301,817 | B1 | * | 10/2012 | Grijalva et al. | 710/112 |
| 2002/0003799 | A1 | * | 1/2002 | Tomita | 370/392 |
| 2003/0088589 | A1 | * | 5/2003 | Good et al. | 707/203 |
| 2004/0042493 | A1 | * | 3/2004 | Emmot | 370/474 |
| 2006/0056404 | A1 | * | 3/2006 | Mueckenheim et al. | 370/389 |
| 2007/0274227 | A1 | * | 11/2007 | Rauscher et al. | 370/252 |
| 2008/0151909 | A1 | * | 6/2008 | Scott et al. | 370/400 |
| 2010/0162265 | A1 | * | 6/2010 | Heddes | 719/314 |
| 2013/0077503 | A1 | * | 3/2013 | Chaudhuri et al. | 370/252 |

* cited by examiner

*Primary Examiner* — Andrew Lai
*Assistant Examiner* — Sumitra Ganguly
(74) *Attorney, Agent, or Firm* — Conley Rose, P.C.; Grant Rodolph; William H. Dietrich (57) ABSTRACT

An apparatus comprising a chip comprising a plurality of nodes, wherein a first node from among the plurality of nodes is configured to receive a first flit comprising a first timestamp, receive a second flit comprising a second timestamp, determine whether the first flit is older than the second flit based on the first timestamp and the second timestamp, transmit the first flit before the second flit if the first flit is older than the second flit, and transmit the second flit before the first flit if the first flit is not older than the second flit.

14 Claims, 5 Drawing Sheets

METHOD AND APPARATUS FOR ACHIEVING FAIRNESS IN INTERCONNECT USING AGE-BASED ARBITRATION AND TIMESTAMPING

CROSS-REFERENCE TO RELATED APPLICATIONS

The present application claims priority to U.S. Provisional Patent Application 61/438,807, filed Feb. 2, 2011 by Rohit Sunkam Ramanujam, et al., and entitled "Method and Apparatus for Achieving Fairness in Interconnect Using Age-Based Arbitration and Timestamping," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

As transistor and other component sizes become smaller and manufacturing techniques continue to improve, more functionality is being placed on single integrated circuits, or chips. The term system on a chip (SoC) generally refers to integrating all the functionality of a computer or other complex electronic system onto a single chip. A SoC may comprise one or more memories, processors, or input/output ports, all integrated into a single chip. One way of allowing various components of a SoC to communicate is to use an on-chip network, sometimes referred to as a network-on-chip. An on-chip network is intended to replace conventional ways of communicating between electronic components in a complex system, such as conventional bus and crossbar interconnections.

On-chip networks may divide network-level packets (e.g. Ethernet frames or Internet Protocol (IP) packets) into smaller data blocks called flits. A node may have multiple flits available for transmission on a virtual channel or other channel resource. One problem in on-chip networks is achieving fairness for flits from different sources competing for virtual channels or other resource. Conventional arbitration techniques, such as round robin, may result in globally unfair bandwidth allocation to different flows (e.g., source-destination pairs), especially when the on-chip network is congested. This is because the bandwidth allocated to a traffic flow may depend at least in part on the number of times the flow participates in arbitrations at intermediate nodes. Consequently, under high network load, flows with longer path lengths receive less bandwidth than flows with shorter path lengths competing for the same resources because packets belonging to longer path flows need to arbitrate at more intermediate nodes. These problems are exacerbated as a number of nodes in an on-chip network increases, and consequently a number of potential intermediate nodes between a source and destination grows.

SUMMARY

In one aspect, the invention includes an apparatus comprising a chip comprising a plurality of nodes, wherein a first node from among the plurality of nodes is configured to receive a first flit comprising a first timestamp, receive a second flit comprising a second timestamp, determine whether the first flit is older than the second flit based on the first timestamp and the second timestamp, transmit the first flit before the second flit if the first flit is older than the second flit, and transmit the second flit before the first flit if the first flit is not older than the second flit.

In another aspect, the invention includes a method implemented in at least one of a plurality of nodes on a chip, the method comprising setting a counter and a state equal to zero, and after each of a plurality of time increments, perform steps comprising if the counter is less than a counter threshold value, incrementing the counter by one, if the counter equals the counter threshold value and the state is less than a state threshold value, resetting the counter equal to zero and incrementing the value of the state by one, and if the counter equals the counter threshold value and the state equals the state threshold value, resetting the counter equal to zero and the state equal to zero.

In yet another aspect, the invention includes an apparatus comprising a chip comprising a network comprising a plurality of nodes, wherein a first node from among the plurality of nodes is configured to maintain a state machine comprising a state and a counter, assign a value of the counter to a timestamp counter and assign a value of the state to a timestamp state, and construct a flit, wherein the flit comprises a timestamp, and wherein the timestamp comprises the timestamp state and the timestamp counter.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and methods for generating timestamps for flits in on-chip networks. The timestamps comprise a timestamp state and a timestamp counter, and a state machine may provide a value of a timestamp state and a timestamp counter for each flit. Also disclosed herein are systems and methods for implementing improved arbitration in on-chip networks using the timestamps. Timestamps may be used in arbitration between two flits competing for a channel resource in an attempt to transmit the older of two flits first. Once a timestamp is generated and assigned to a flit, it may not be necessary to modify the timestamp at nodes as the flit traverses an on-chip network. The systems and methods may guarantee latency fairness by prioritizing flits based on their age in the network, and may ensure global fairness between traffic flows and equalize communication latency on the chip.

Figure 1:
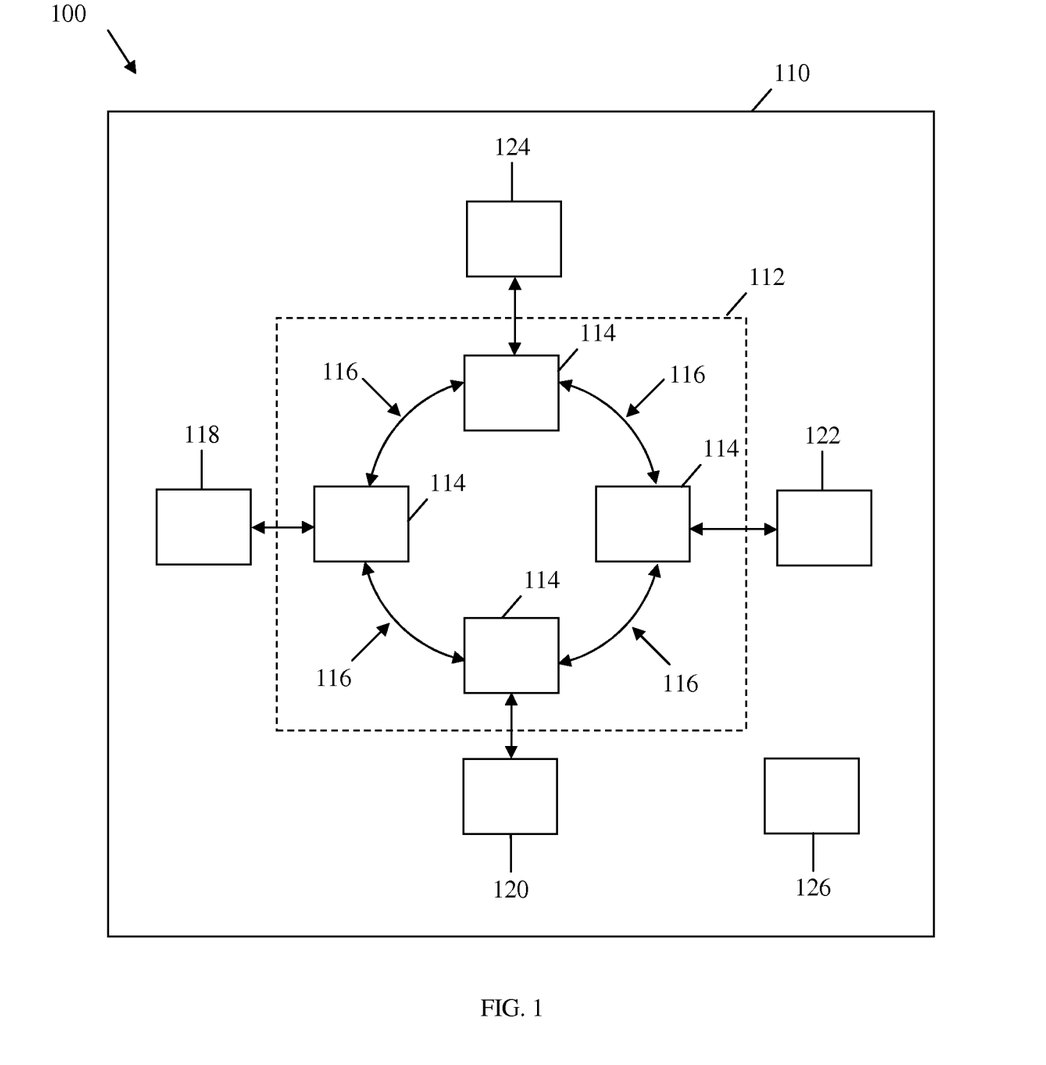
FIG. 1 is a schematic diagram of an embodiment of a system on a chip.

An on-chip network may be configured to provide communication capability between various components that reside in a single chip. FIG. 1 is a schematic diagram of an embodiment of a system on a chip (SoC) 100 with an on-chip network 112. Specifically, the SoC 100 comprises an on-chip network 112 comprising a plurality of nodes 114. The on-chip network 112 may be configured to provide communications capability between components 118, 120, 122, and 124 via the nodes 114, where the on-chip network 112 and components 118, 120, 122, and 124 are located on a single chip 110. While four components 118, 120, 122, and 124 are illustrated in FIG. 1, it will be appreciated that an on-chip network 112 may connect any number and/or type of components 118, 120, 122, and 124.

The nodes 114 may be any devices that promote routing of flits within the on-chip network 112. For example, at least some of the nodes may break an incoming packet (e.g. an IP packet or Ethernet frame) into flits if such is not done by the components 118, 120, 122, and 124, and/or reassemble the flits into an outgoing packet if such is not done by the components 118, 120, 122, and 124. In doing so, at least some nodes 114 may maintain a state machine, add timestamps to the flits entering the on-chip network 112, and/or remove timestamps from the flits exiting the on-chip network 112, as described below. In addition, the nodes 114 may perform flit routing in that they receive flits and determine which of a plurality of virtual channels on which to transmit the flits. As part of the routing, the nodes 114 may arbitrate two flits competing for a common resource (e.g. a virtual channel in a link 116) by determining which of the two flits is older based on the timestamps in the flits. To perform these various functions, each node 114 may include a processor that is in communication with a memory, such as a read only memory (ROM), a random access memory (RAM), or any other type of memory. Each processor may be a general-purpose processor or may be an application-specific processor. Alternatively, at least some of the nodes 114 may be implemented with no local memory, but have access to an external memory that may be located on another part of the SoC 100 and perhaps shared by other nodes 114. Finally, at least some of the nodes 114 may be implemented with no local memory and no memory access.

The links 116 may be any devices that carry flits between nodes 114 and/or components 118, 120, 122, and 124. The links 116 are typically electrical links, but may be optical or wireless links. At least some of the links 116 may be divided into a plurality of virtual channels, for example, by segmenting available link 116 resources (e.g. time and/or frequency) into a plurality of slots (e.g. time slots and/or frequency slots) that carry the flits.

The components 118, 120, 122, and 124 may be any type of devices that process the flits. Generally, the components 118, 120, 122, and 124 may be devices that perform some function that is more specialized than the functions performed by the nodes. For example, the components 118, 120, 122, and 124 may include memories, processors, input/output (I/O) devices such as ingress or egress ports, or any other electronic components. While the nodes 114 may comprise processors and/or memories, the capacity and/or throughput of the processors and/or memories in the components 118, 120, 122, and 124 typically greatly exceed those of the nodes 114 such that it would be not be possible or practical for the nodes 114 to perform the functions performed by the components 118, 120, 122, and 124. In cases where one of the components 118, 120, 122, and 124 is an ingress port, it may remove protocol layers from an incoming packet (e.g. an IP packet or Ethernet frame), break the incoming packet into flits, maintain a state machine, and/or add timestamps to the flits entering the on-chip network 112, if such is not done by the nodes 114. In cases where one of the components 118, 120, 122, and 124 is an egress port, it may maintain a state machine, remove timestamps from the flits exiting the on-chip network 112, reassemble the flits into an outgoing packet (e.g. an IP packet or Ethernet frame), and/or add protocol layers to the outgoing packet, if such is not done by the nodes 114.

The nodes 114 and links 116 may be arranged in any suitable configuration. For example, the nodes 114 may be configured in a bi-directional ring network with bi-directional links 116 between nodes 114 as shown in FIG. 1. Alternatively, links 116 between nodes 114 may be unidirectional. Further in the alternative, the nodes 114 may be arranged in a mesh configuration in which the nodes 114 are aligned in a rectangular grid configuration and each node 114 is connected, via a link 116, to any other nodes 114 that are adjacent to the side of the node 114. Although FIG. 1 shows four nodes 114, an on-chip network 112 may comprise any number of nodes 114 and links 116.

At least some of the nodes 114 and/or components 118, 120, 122, and 124 may share a common clock signal generated by a clock 126. In some embodiments, the clock 126 may be the only clock 126 on the chip 110. In addition, although the clock 126 is illustrated in FIG. 1 as residing on the same chip as the on-chip network, the clock may be on a separate chip. The clock 126 may produce a signal and/or may have a fixed cycle time, referred to as a clock cycle, which may be used to maintain a state machine and/or pace the various functions of the nodes 114 and/or components 118, 120, 122, and 124. The nodes 114 and/or components 118, 120, 122, and 124 may share a same clock signal or may use one or more different clock signals, perhaps obtained from other chips.

In on-chip networks, nodes may be configured to transmit and receive units of information referred to as flow control digits or flits. Flits may be formed by segmenting packets, e.g., Ethernet packets or IP packets, that enter an on-chip network. A flit that enters an on-chip network may also be referred to as being injected into an on-chip network. Referring to FIG. 1 as an exemplary example, a component, such as component 122, may transmit a packet to corresponding node 114. Node 114 may be configured to receive the packet and segment the packet into smaller units of information. Alternatively, a component, such as 122, may segment a packet into smaller units. Each unit of information may be placed into a flit. There may be different types of flits, such as head flits, body flits, and tail flits. A packet that is segmented into smaller units may be distributed over a head flit, one or more body flits, and a tail flit, and these flits may maintain a specified order (e.g. head first, then body, then tail) as they are routed and/or processed on the chip 110. A head flit may be used to acquire resources in an on-chip network for the series of flits corresponding to a packet, and a tail flit may be used to release resources. A head flit may also comprise the packet's header (e.g. the packet's destination address, source address, etc.), and may contain some of the packet payload, whereas the body and tail flits generally do not contain any of the packet's header. In cases where the packet's header is particularly long, the packet's header may be included in the head flit and some of the body flits, but not the remaining body flits or the tail flit. Although particular schemes for assigning information to flits are presented, any scheme for assigning information to flits is within the scope of this application.

Figure 2:
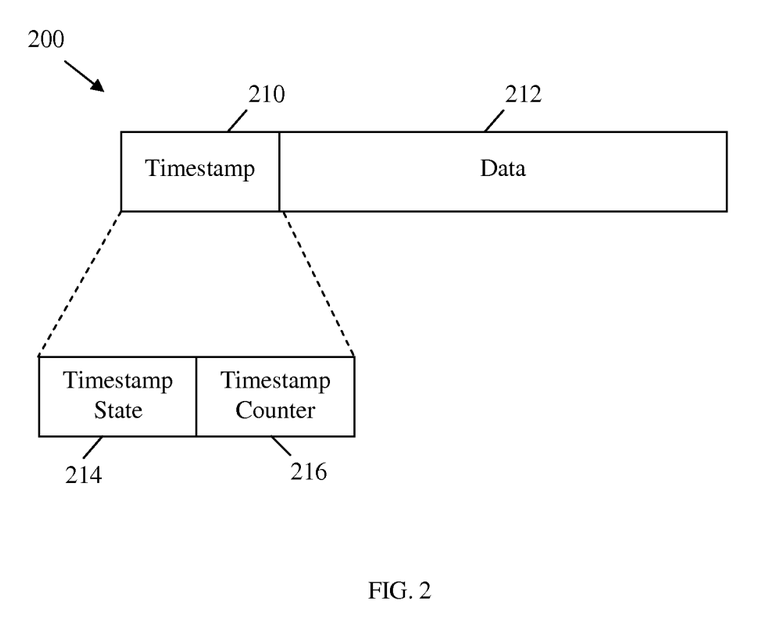
FIG. 2 is a diagram of an embodiment of a flit.

FIG. 2 illustrates a flit 200 according to one embodiment. The flit 200 may comprise a timestamp 210 and a data portion 212. The timestamp 210 and data portion 212 may be in any order, or a timestamp 210 may lie between parts of the corresponding data portion 212. A node in an on-chip network may use information in the timestamp 210 to determine an age of the flit 200 and/or arbitrate two flits 200, as discussed in further detail below.

The timestamp 210 may comprise a timestamp state 214 and a timestamp counter 216. The timestamp 210 may comprise k bits, the timestamp state 214 may comprise two bits, and the timestamp counter may comprise k−2 bits. The timestamp state 214 and the timestamp counter 216 may appear in either order as part of the timestamp 210.

The data portion 212 comprises one or more bits. As discussed earlier, a flit 200 may comprise data from a segment of a packet, and one or more segments of a packet may be placed in the data portion 212. However, a flit as discussed herein is not so limited, and the data portion 212 may comprise any information.

Each node in an on-chip network may keep track of the current time. A timestamp 210 may be related to a time that a flit enters an on-chip network. Time may be measured by a number of completed clock cycles. A time of entry for a flit may be defined according to the occurrence of any of a number of events. For example, a time of entry may correspond to a clock cycle in which a flit first enters a queue in a node in an on-chip network. As another example, a time entry may correspond to a clock cycle in which a flit is received at an input port in a node in an on-chip network. In an embodiment, all nodes in an on-chip network may use the same definition of time of entry.

One problem in representing age of a flit using time, as measured by number of clock cycles or other time increment, is that a linear representation of time is unbounded, whereas the flits have a finite number of bits in which to represent the time. Instead of an unbounded linear representation, a circular representation of time may be employed, and the circular representation of time may be implemented using a state machine such as state machine 300 illustrated in FIG. 3. The state machine 300 may be used to generate timestamps for flits, and ingress nodes receiving flits in an on-chip network may implement state machine 300. Further, standard logic circuitry may be used to implement state machine 300. The state machine 300 may use the completion of each clock cycle as a trigger to update state and counter values, but it will be appreciated that any time increment may be used as a trigger for updating state machine 300. For example, some multiple of clock cycle, such as two or more clock cycles, may serve as a trigger. Using a multiple of a clock cycle as a trigger may result in a more coarse resolution of time than using a single clock cycle, but one benefit may be that larger intervals of time may be represented using the same number of bits. Nonetheless, for purposes of illustration a single clock cycle is used as the trigger for updating state machine 300 in the description below.

Figure 3:
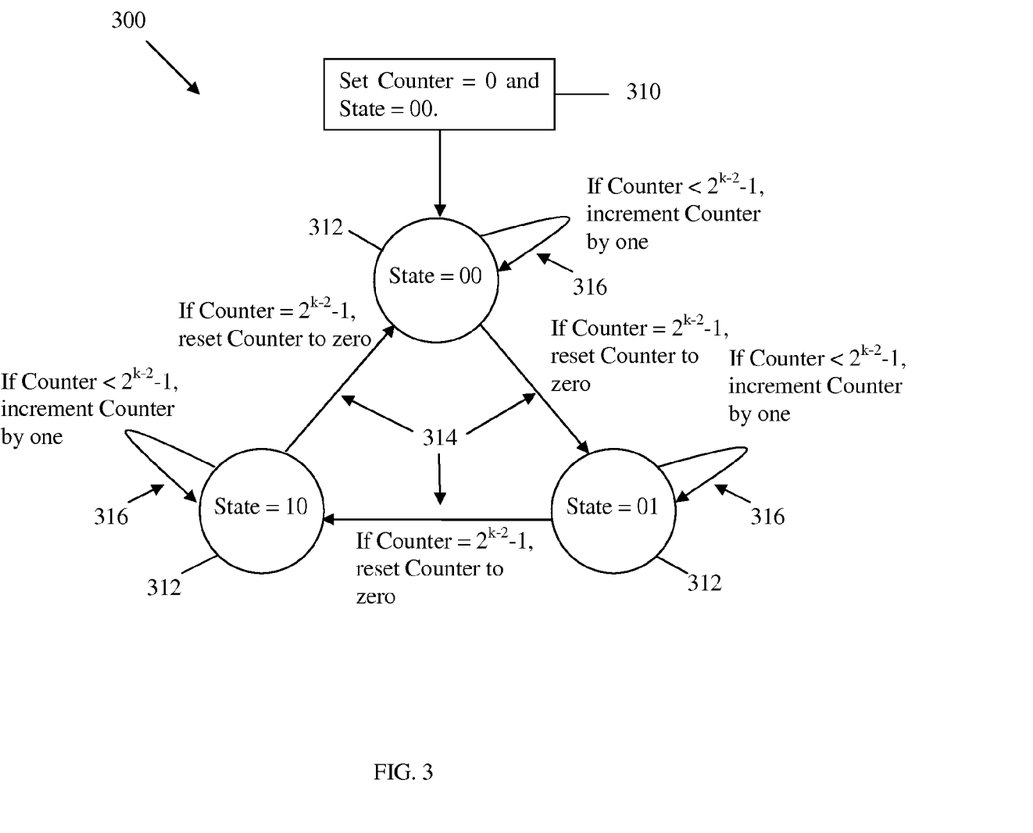
FIG. 3 is a diagram of an embodiment of a state machine.

In step 310, a counter may be initially set equal to zero and the state machine may begin in state 00. Each node in an on-chip network may set its state machine and counter to zero at substantially the same time. The states 312 of the state machine are represented in binary form, using two bits for the binary representation. State 10, for example, corresponds to a decimal value of two. The value of k may be equal to a number of bits used to represent a timestamp and may be equal to at least four.

Completion of a clock cycle causes counter and state to be updated. If counter is less than $2^{k-2}-1$ after each clock cycle, counter is incremented by one and state remains the same as the previous clock cycle, according to state transitions 316. However, if counter is equal to a threshold value, such as $2^{k-2}-1$, counter is reset to zero and state is updated according to state transitions 314. For example, while in state 00, counter is incremented by one at the end of each clock cycle. However, if counter is equal to a threshold value, such as $2^{k-2}-1$, counter is reset to zero and state is updated to state 01. While in state 01, counter is incremented by one at the end of each clock cycle. However, if counter is equal to a threshold value, such as $2^{k-2}-1$, counter is reset to zero and state is updated to state 10. While in state 10, counter is incremented by one at the end of each clock cycle. However, if counter is equal to a threshold value, such as $2^{k-2}-1$, counter is reset to zero and state is updated to state 00. State and counter continue to be updated in such a manner after each clock cycle. Although in the present description state is reset to 00 after reaching a maximum value, or state threshold, of 10, any number of states may be used in the state diagram, with corresponding different values of state threshold.

Figure 4:
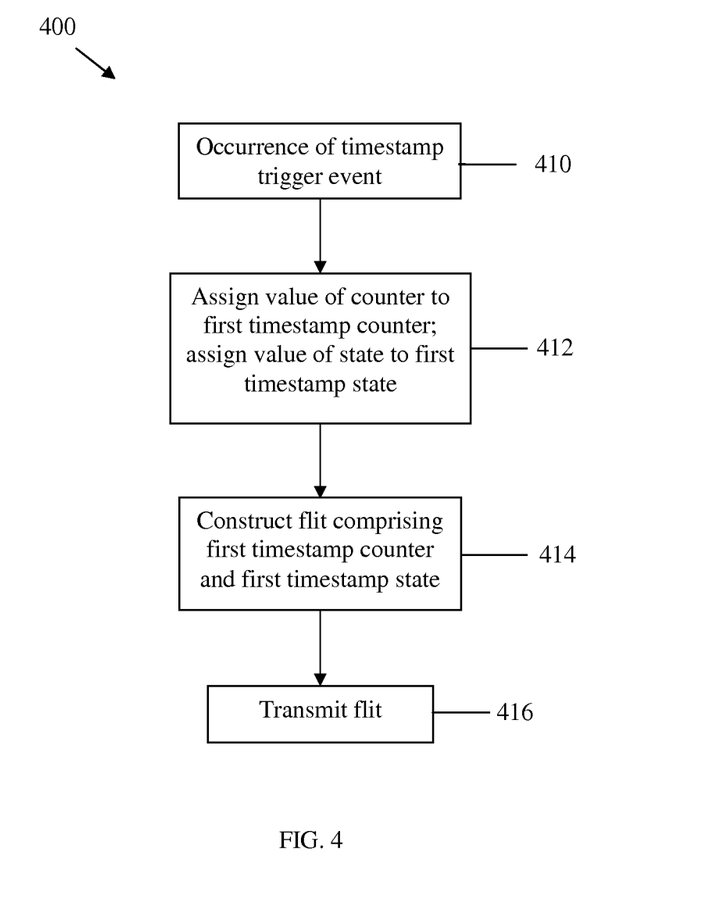
FIG. 4 is a flowchart of an embodiment of a flit construction and transmission method.

FIG. 4 shows one embodiment of a flit construction and transmission method 400. All of the steps may be carried out in a node in an on-chip network. The embodiment may make use of the state machine presented in FIG. 3 for assigning a timestamp to a flit. A timestamp trigger event occurs in step 410. A timestamp trigger event is an event that causes a timestamp to be generated. A timestamp may be generated according to values of state and counter in a state machine according to FIG. 3. As discussed earlier, a timestamp trigger event may correspond to a time of entry of a flit into an on-chip network, and a time of entry may be defined according to the occurrence of any of a number of events, such as a clock cycle in which a first flit enters a queue in a node or component in an on-chip network.

After the occurrence of timestamp trigger event in step 410, a value of counter is assigned to a first timestamp counter and a value of state is assigned to a first timestamp state at step 412. Values of counter and state may be derived from a state machine according to FIG. 3. Next, a flit is constructed at step 414. The flit may comprise a timestamp and data, as illustrated, for example, in FIG. 2. The timestamp may comprise the first timestamp counter and the first timestamp state from step 412 and may be constructed as shown in FIG. 2. The flit is transmitted at step 416. The flit may be transmitted to an adjacent node, for example over a virtual channel or other channel resource.

Figure 5:
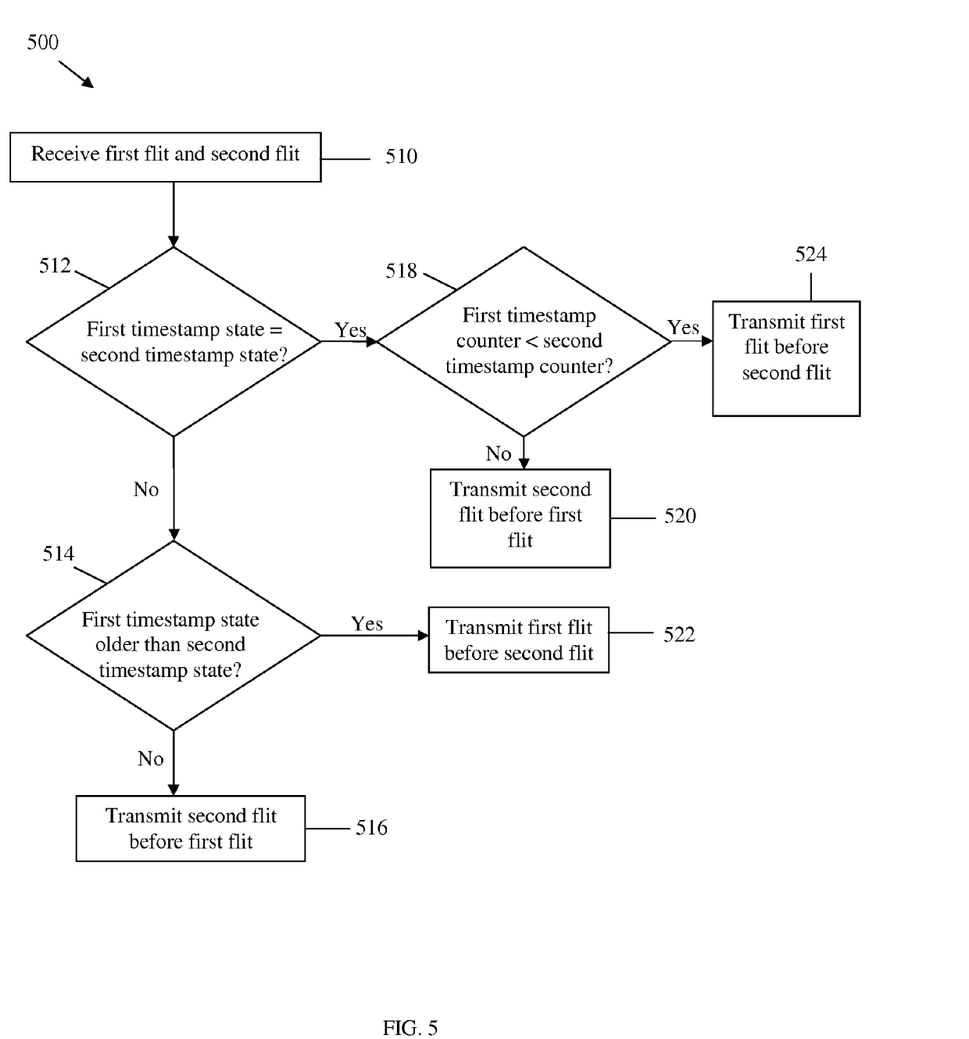
FIG. 5 is a flowchart of an embodiment of a flit arbitration method.

Occasionally two flits may be available for transmission over the same channel resource, and arbitration may take place at a node to determine which flit to transmit first. Arbitration may refer to the process of prioritizing one flit over another flit when two or more flits are available for transmission over a channel resource, such as a virtual channel. FIG. 5 is a flowchart of an embodiment of flit arbitration method 500. The steps of method 500 may be implemented in a node in an on-chip network. The method 500 may select the older of two flits to transmit first by comparing the timestamps of the two flits as follows.

In step 510, a first flit and a second flit are received. The flits may be received at a node, and may be received in any order or substantially simultaneously. Typically, the first flit comprises a first timestamp state and a first timestamp counter, and the second flit comprises a second timestamp state and a second timestamp counter. At step 512, a determination is made whether the first timestamp state equals the second timestamp state. If so, the method 500 may proceed to step 518. At step 518, a determination is made whether first timestamp counter is less than second timestamp counter. If so, step 524 is performed in which the first flit is transmitted before the second flit. If the first timestamp counter is not less than the second timestamp counter at step 518, step 520 is performed in which the second flit is transmitted before the first flit.

Returning to step 512, if the first timestamp state is not equal to the second timestamp state, the method proceeds to step 514. At step 514, a determination is made whether a first timestamp state is older than a second timestamp state. For example, if state machine 300 of FIG. 3 is used according to the flowchart of FIG. 4 to generate values of the first timestamp state ($x_1$) and the second timestamp state ($x_2$) the following conditions may indicate that the first flit is older than the second flit: $x_1$=10 and $x_2$=00, or $x_1$=01 and $x_2$=10, or $x_1$=00 and $x_2$=01. If the first timestamp state is older than the second timestamp state, the first flit is transmitted before the second flit in step 522. If the conditions in step 514 are not met, i.e., if the first timestamp state is not older than the second timestamp state, the second flit is transmitted before the first flit in step 516.

The first transmitted flit according to the flowchart in FIG. 5 will be the older of the two flits, if each flit uses a timestamp assignment methodology as described earlier with reference to FIGS. 3 and 4, and if the difference in age between the oldest flit and the youngest flit in an on-chip network is less than $2^{k-2}$ clock cycles. If the difference in age between the oldest flit and the youngest flit in an on-chip network is less than $2^{k-2}$ clock cycles, at most two of the three states 00, 01, and 10 may exist among flits in an on-chip network during any given clock cycle—states 00 and 01, or states 01 and 10, or states 10 and 00—with state 00 being older than 01, state 01 being older than 10, and state 10 being older than 00. Further, timestamp arbitration using this method has an advantage that it is of sufficiently low complexity for implementation in on-chip networks.

There are several unique aspects of the present arbitration method. First, once the timestamps are added to the flits, they are not modified in any way until they are removed from the flit, e.g. when the flits are reassembled into a packet. Thus, there is no need for any type of timestamp modification functionality at the intermediate nodes (e.g. the nodes between the ingress node or component that adds the timestamp and the egress node or component that removes the timestamp). Second, the various flits from a packet (e.g. the head, body, and tail flits) may become separated from each other when being routed in the on-chip network, but they will generally stay in the same order. For example, if an ingress node transmits a head flit first and immediately after transmits a body flit, there may be some other flits that are inserted between the head flit and the body flit when the flits are routed through the on-chip network. However, the head flit will arrive at an egress node before the body flit. Third, the timestamping method according to the state machine 300 in FIG. 3 employed in the flowchart of an embodiment of a flit construction and transmission method of FIG. 4 has an advantage that timestamp computation needs to be performed only once for every flit, with the computation performed in a node where the flit is injected into an on-chip network. No additional computation is needed for the flit at any other node serving as an intermediate node between a source node and a destination node.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a chip comprising a plurality of nodes that form an on-chip network, wherein a first node from among the plurality of nodes is configured to:
  receive a first flit comprising a first timestamp;
  receive a second flit comprising a second timestamp;
  determine whether the first flit is older than the second flit based on a value of the first timestamp and a value of the second timestamp;
  transmit the first flit before the second flit based upon a determination that the first flit is older than the second flit; and
  transmit the second flit before the first flit based upon a determination that the first flit is not older than the second flit,
wherein the first timestamp is a time when the first flit enters the on-chip network,
wherein the first flit and the second flit are segments of a packet,
wherein a second node from among the plurality of nodes is configured to:
  set a counter to zero;
  set a state equal to zero; and
  after each of a plurality of time increments, perform steps comprising:
    if a value of the counter is less than a counter threshold value, increment the counter by one; and
    if the value of the counter equals the counter threshold value and a value of the state is less than two, reset the value of the counter equal to zero and increment the value of the state by one; and
    if the value of the counter equals the counter threshold value and the value of the state equals two, reset the value of the counter equal to zero and the state equal to zero;
    assign the value of the counter to the value of the first timestamp counter and assign the value of the state to the value of the first timestamp state;
    construct the first flit; and
    transmit the first flit to the first node,
  wherein the first flit is segmented from a network-level packet, and
  wherein protocol layers are removed from the first flit.

2. The apparatus of claim 1, wherein the first timestamp comprises a first timestamp state and a first timestamp counter, wherein the second timestamp comprises a second timestamp state and a second timestamp counter, wherein determining whether the first flit is older than the second flit comprises:
  comparing a value of the first timestamp state and a value of the second timestamp state; and
  comparing a value of the first timestamp counter and a value of the second timestamp counter if the first timestamp state is equal to the second timestamp state,
  wherein the second timestamp is a second time that indicates when the second flit enters the on-chip network,
  wherein the first flit is determined to be older than the second flit if the first timestamp state is older than the second timestamp state,
  wherein the second flit is determined to be older than the first flit if the second timestamp state is older than the first timestamp state,
  wherein the first flit is determined to be older than the second flit if the value of the first timestamp state is equal to the value of the second timestamp state and the value of the first timestamp counter is less than the value of the second timestamp counter, and
  wherein the second flit is determined to be older than the first flit if the value of the first timestamp state is equal to the value of the second timestamp state and if the value of the second timestamp counter is less than the value of the first timestamp counter.

3. The apparatus of claim 2, wherein the first timestamp state is represented by two bits and the second timestamp state is represented by two bits, wherein the first timestamp state may equal to zero, one, or two, and wherein the second timestamp state may equal to zero, one, or two.

4. The apparatus of claim 3, wherein the first flit is determined to be older than the second flit if the value of the first timestamp state is equal to two and the value of the second timestamp state is equal to zero, or if the value of the first timestamp state is equal to one and the value of the second timestamp state is equal to two, or if the value of the first timestamp state is equal to zero and the value of the second timestamp state is equal to one, and wherein the second flit is determined to be older than the first flit if the value of the second timestamp state is equal to two and the value of the first timestamp state is equal to zero, or if the value of the second timestamp state is equal to one and the value of the first timestamp state is equal to two, or if the value of the second timestamp state is equal to zero and the value of the first timestamp state is equal to one.

5. The apparatus of claim 1, wherein the first node comprises an egress port configured to transmit data over a link, wherein the link comprises a plurality of virtual channels, and wherein the first flit and the second flit are transmitted over the same virtual channel.

6. The apparatus of claim 1, wherein the first flit is one of the following types of flit: a head flit, a body flit, or a tail flit, and wherein the head flit is used to acquire resources in the on-chip network for a series of flits that correspond to an incoming data packet.

7. The apparatus of claim 1, wherein the first flit is a segment of an incoming data packet with removed protocol layers.

8. The apparatus of claim 1, wherein the first timestamp consists essentially of a time that indicates when the first flit enters the on-chip network.

9. A method implemented in at least one of a plurality of nodes on a chip that forms an on-chip network, the method comprising:
  setting a counter to zero;
  setting a state to zero;
  after each of a plurality of time increments, perform steps comprising:
    incrementing the value of the counter by one when a value of the counter is less than a counter threshold value; and
    resetting the value of the counter equal to zero and incrementing the value of the state by one when the value of the counter equals the counter threshold value and the value of the state is less than a state threshold value; and
    resetting the value of the counter equal to zero and the state equal to zero when the value of the counter equals the counter threshold value and the value of the state equals the state threshold value; and
  generating a timestamp within a flit using the value of the counter and the value of the state,
  wherein the timestamp is a time when the flit enters the on-chip network, and
  wherein the flit is a segment of a packet,
  assigning a value of the counter to a value of a timestamp counter and assigning a value of the state to a value of a timestamp state; and constructing the flit, wherein the flit comprises the timestamp, wherein the timestamp comprises the timestamp state and the timestamp counter.

10. The method of claim 9, wherein the state threshold value is equal to two, wherein the timestamp is represented by k bits, wherein the timestamp state is represented by two bits, wherein the timestamp counter is represented by k−2 bits, and wherein the counter threshold value is equal to $2^{k-2}-1$.

11. The method of claim 9, wherein the flit is one of the following types of flit: a head flit, a body flit, or a tail flit, and wherein the head flit references one or more resources on the on-chip network that correspond to the network-level packet.

12. The method of claim 9, wherein the flit comprises a part of a network-level packet with removed network protocol layers.

13. A method implemented in at least one of a plurality of nodes on a chip that forms an on-chip network, the method comprising:
    setting a counter to zero;
    setting a state to zero; and
    after each of a plurality of time increments, perform steps comprising:
        incrementing the value of the counter by one when a value of the counter is less than a counter threshold value;
        resetting the value of the counter equal to zero and incrementing the value of the state by one when the value of the counter equals the counter threshold value and the value of the state is less than a state threshold value; and
        resetting the value of the counter equal to zero and the state equal to zero when the value of the counter equals the counter threshold value and the value of the state equals the state threshold value; and
    generating a timestamp within a flit using the value of the counter and the value of the state,
    wherein the timestamp is a time when the flit enters the on-chip network, and
wherein the flit is a segment of a packet,
    receiving a network-level packet; and
    segmenting the network-level packet into a plurality of information units,
    wherein the flit comprises one of the plurality of information units.

14. The method of claim 13, wherein each of the plurality of time increments is equal to a clock cycle, and wherein the method further comprises removing the protocol layers from the network-level packet when constructing the flit.

* * * * *